United States Patent
Ho et al.

(10) Patent No.: US 11,034,294 B2
(45) Date of Patent: *Jun. 15, 2021

(54) DRIVING NOTIFICATION METHOD AND DRIVING NOTIFICATION SYSTEM

(71) Applicant: Acer Incorporated, New Taipei (TW)

(72) Inventors: Andy Ho, New Taipei (TW); Tsung-Han Yang, New Taipei (TW); Szu-Chieh Wang, New Taipei (TW); Jian-Chi Lin, New Taipei (TW); Jason Hsiao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,457

(22) Filed: May 13, 2020

(65) Prior Publication Data

US 2020/0269757 A1    Aug. 27, 2020

Related U.S. Application Data (63) Continuation of application No. 15/919,224, filed on Mar. 13, 2018, now Pat. No. 10,696,224.

(30) Foreign Application Priority Data

Nov. 1, 2017    (TW) .................. 106137727

(51) Int. Cl.
*B60Q 9/00* (2006.01)
*G06K 9/00* (2006.01)
*G06F 3/01* (2006.01)

(52) U.S. Cl.
CPC ............. *B60Q 9/008* (2013.01); *G06F 3/013* (2013.01); *G06K 9/0061* (2013.01); *G06K 9/00805* (2013.01); *G06K 9/00818* (2013.01)

(58) Field of Classification Search
CPC ...... B60Q 9/008; G06F 3/013; G06K 9/0061; G06K 9/00805; G06K 9/00818; B60W 60/0053; B60W 60/00; B60W 60/005; B60W 60/0054; B60W 60/0055; B60W 40/08; B60W 50/082; B60W 50/14; B60W 2050/146; B60W 2720/24; G05D 1/0061;

(Continued)

(56) References Cited

U.S. PATENT DOCUMENTS 7,859,652 B2 * 12/2010 Uechi .................. B60W 30/10
356/29
2011/0169625 A1 * 7/2011 James .................. G08G 1/166
340/439

(Continued)

*Primary Examiner* — Hai Phan
*Assistant Examiner* — Anthony D Afrifa-Kyei
(74) *Attorney, Agent, or Firm* — JCIPRNET (57) ABSTRACT

A driving notification method and a driving notification system are provided. The driving notification system is disposed on a mobile vehicle, and the driving notification method includes following steps. A surrounding image is captured through an image capturing device. A target object detection is performed to the surrounding image to obtain a target position of an image detection object. A gaze position of a driver is detected through an eye tracking device. Whether the gaze position matches the target position is determined. An alarm device is controlled to activate an alarming operation if the gaze position does not match the target position.

16 Claims, 7 Drawing Sheets

(58) Field of Classification Search
CPC ............ G05D 2201/0213; B60K 35/00; B60K 2370/146; B60K 2370/152
See application file for complete search history.

(56) References Cited

U.S. PATENT DOCUMENTS

2015/0203023 A1\* 7/2015 Marti ..................... B60Q 1/503
340/425.5
2016/0001781 A1\* 1/2016 Fung ..................... B60K 28/02
701/36

\* cited by examiner

DRIVING NOTIFICATION METHOD AND DRIVING NOTIFICATION SYSTEM

CROSS-REFERENCE TO RELATED APPLICATION

This is a continuation application of and claims the priority benefit of U.S. application Ser. No. 15/919,224, filed on Mar. 13, 2018, which claims the priority benefit of Taiwan application serial no. 106137727, filed on Nov. 1, 2017. The entirety of each of the above-mentioned patent applications is hereby incorporated by reference herein and made a part of this specification.

BACKGROUND OF THE INVENTION

1. Field of the Invention

The invention relates to a driving assistance technology. More particularly, the invention relates to a driving notification method and a driving notification system.

2. Description of Related Art

Along with increasing numbers and types of the transportation vehicles, probability of traffic accidents grows year by year. In addition to continuous improvement in vehicle power, driving safety is apparently another issue that needs to be focused on in the field of transportation technology. For instance, various objects, such as traffic signs, pedestrians, and obstructions, that need a driver to pay attention to may exist on a road that a driver drives on. The driver is required to concentrate on the traffic in order to perform the next driving action.

Nowadays, traffic accidents occur most of the time when the driver fails to pay attention to the traffic conditions. The driver may fail to notice the traffic signs or the obstructions on the road when feeling tired or being distracted. As such, the driver does not perform correct driving actions according to the traffic signs or the obstructions in front of the vehicle. For instance, if the driver is distracted by a cell phone and thus does not notice a color change of the traffic lights, the driver may not be able to react in time and runs through a red light or a yellow light as a result. If the driver is extremely tired and thus does not notice the speed limit sign on the road, the driver may exceed the speed limit. The foregoing situations may lead to traffic accidents easily. In other words, if the driver can pay attention to the objects on the road that needs to be noticed, the number of traffic accidents can be significantly reduced.

SUMMARY OF THE INVENTION

The invention provides a driving notification method and a driving notification system which can determine whether a line-of-sight of a driver is gazed at a target object through an eye tracking device and activate an alarm when the line-of-sight of the driver is detected not to be gazed at the target object so as to enhance safety of driving transportation vehicles.

In an embodiment of the invention, a driving notification method is provided and is suitable for a driving notification system including an eye tracking device and an image capturing device. The driving notification system is disposed on a mobile vehicle, and the driving notification method includes following steps. A surrounding image is captured through the image capturing device. A target object detection is performed to the surrounding image to obtain a target position of an image detection object. A gaze position of a driver is detected through the eye tracking device. Whether the gaze position matches the target position is determined. An alarm device is controlled to activate an alarming operation if the gaze position does not match the target position.

From another aspect, in an embodiment of the invention, a driving notification system is provided and includes an image capturing device, an eye tracking device, a memory, and a processor. The memory stores a plurality of instructions. The processor is coupled to the image capturing device, the eye tracking device, and the memory. The processor is configured to execute the instructions to: capture a surrounding image through the image capturing device; perform a target object detection to the surrounding image to obtain a target position of an image detection object; detect a gaze position of a driver through the eye tracking device; determine whether the gaze position matches the target position; and control an alarm device to activate an alarming operation if the gaze position does not match the target position.

To sum up, in the driving notification method and the driving notification system provided by the embodiments of the invention, the gaze position of the eyes of the driver is tracked. Moreover, the target position of the image detection object on the surrounding image is obtained through image capturing and target object detection. As such, whether a line-of-sight of the driver falls on the target object can be accordingly detected through comparing between the gaze position of the eyes of the driver and the target position of the image detection object. Therefore, if the gaze position detected by the eye tracking device does not match the target position of the image detection object of the target object, the alarming operation can be activated to notify the driver.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Several embodiments of the invention are described in detail below accompanying with figures. In terms of the reference numerals used in the following descriptions, the same reference numerals in different figures should be considered as the same or the like elements. The embodiments are only a portion of the invention, which do not present all embodiments of the invention. To be more specifically, the embodiments serves as examples of the method, the electronic device, and the computer readable storage medium fall within the scope of the claims of the invention.

Figure 1:
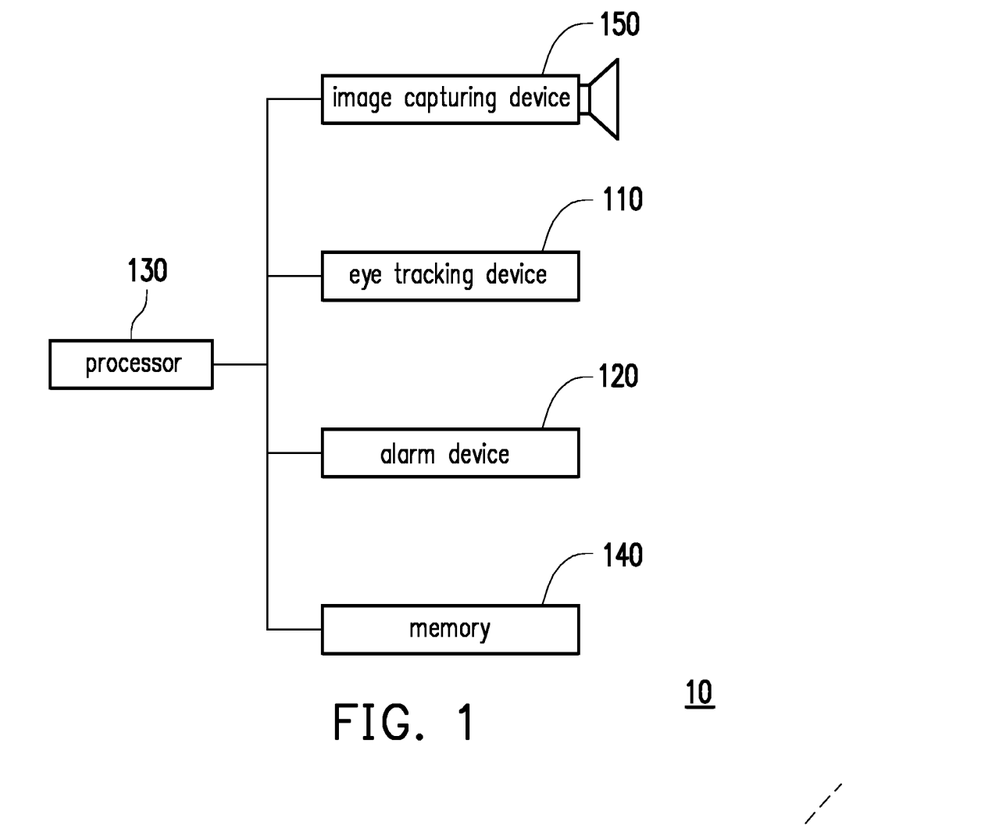
FIG. 1 is a block diagram of a driving notification system according to an embodiment of the invention.

FIG. 1 is a block diagram of a driving notification system according to an embodiment of the invention. With reference to FIG. 1, a driving notification system 10 includes an eye tracking device 110, an alarm device 120, a processor 130, a memory 140, and an image capturing device 150.

The driving notification system 10 is suitable for being disposed on a mobile vehicle and is capable of detecting a surrounding target object continuously when a driver is driving or riding the mobile vehicle. The mobile vehicle is one type of transportation which can be moved through human control, such as cars, buses, bicycles, scooters, ships, airplanes, and motor machines of various types, which should however not be construed as limitations to the invention. Here, the driving notification system 10 can further detect an eye ball feature of the driver so as to identify a gaze position of the driver. By comparing between a location of the target object and the gaze position of the driver, the driving notification system 10 can determine whether a line-of-sight of the driver falls on the target object required to be noticed. As such, when the line-of-sight of the driver is detected not to gaze at the target object required to be noticed when the driver is driving, the driving notification system 10 can timely send an alarm to notify the driver.

The eye tracking device 110 is a kind of equipment capable of tracking and measuring eye position and eye movement and is suitable for detecting the eye ball feature of the driver. In one embodiment, the eye tracking device 110 can include a face image capturing module configured to determine the gaze position of the driver according to a facing orientation of face and a pupil position through capturing a face image and an eye image of the driver. In one embodiment, the eye tracking device 110 may include a light emitting module and an eye image capturing module. The light emitting module of the eye tracking device 110 emits light beams towards the eyes of the driver, and the eye image capturing module of the eye tracking device 110 captures the eye image. The eye tracking device 110 detects the pupil position and a bright spot position of the driver in the eye image and determines the current gaze position of the line-of-sight of the eyes according to a corresponding positional relation between the pupil position and the bright spot position. The bright spot position are reflective points formed by irradiating the eyes of the driver by emitting the light beams through the light emitting module.

The alarm device 120 is configured to perform an alarming operation to issue an alarming signal for the driver. The alarm device 120 may be an in-car dashboard, a navigation device, a user's cell phone, etc. Various alarming operations can be performed according to the types of the alarm device 120 to issue corresponding alarming signals. For instance, when the alarm device 120 acts as the car dashboard, the alarming signal may be a text notification, a flash light notification, a color changing notification, etc. When the alarm device 120 acts as an in-car speaker or the driver's cell phone, the alarming signal may be a voice notification. When the alarm device 120 acts as a navigation device, the alarming signal may be a text notification, a voice notification, etc. Alternatively, the alarm device 120 may also be a component of the mobile vehicle in contact with the driver, such as a seat, a steering wheel, or the like. In other words, the alarming signal may be a type of notification provided through seat vibration, steering wheel vibration, etc., and any method capable of providing notifications to the driver is applicable to the invention.

The processor 130 is coupled to the eye tracking device 110, the alarm device 120, the memory 140, and the image capturing device 150 to control overall operation of the driving notification system 10. In this embodiment, the processor 130 may be, for example, a central processing unit (CPU), a programmable microprocessor, a digital signal processor (DSP), a programmable controller, an application specific integrated circuit (ASIC), a programmable logic device (PLD), or other hardware devices with computing capability, which should however not be construed as limitations to the invention.

The memory 140 is, for example, a fixed or movable random access memory (RAM) in any form, a read-only memory (ROM), a flash memory, a hard disc, other similar devices, or a combination of these devices, for example. The memory 140 is configured to store a data, a program code, an image, etc. which may be used during the operation of the driving notification system 10. That is, the memory 140 is further configured to record a plurality of instructions executed by the processor 130.

The image capturing device 150 is disposed on the mobile vehicle and is configured to capture a surrounding image in front of the mobile vehicle. The image capturing device 150 is an image sensor including, for example, a charge coupled device (CCD) or a complementary metal-oxide semiconductor (CMOS) for capturing the surrounding image. In an embodiment, the image capturing device 150 may be disposed at the front of the vehicle, e.g. above a windshield of the vehicle, for capturing a traffic image in front of the vehicle. Alternatively, the image capturing device 150 may also act as a driving recorder or a digital camera disposed above the vehicle. Nevertheless, the invention is not limited to the above applications.

Figure 2:
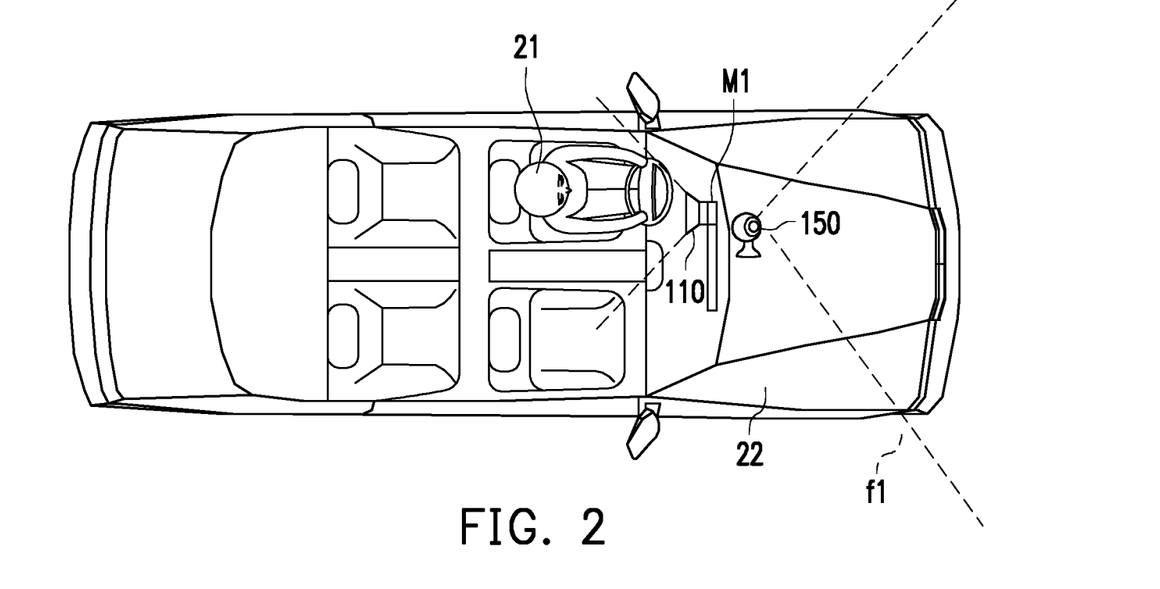
FIG. 2 is a block diagram of a driving notification system and a mobile vehicle according to an embodiment of the invention.

FIG. 2 is a block diagram of a driving notification system and a mobile vehicle according to an embodiment of the invention. With reference to FIG. 2, if the driving notification system 10 is applied to a car driving environment, when a driver 21 drives a car 22 (i.e., the mobile vehicle), the image capturing device 150 may face the front of the car 22 to capture an image based on a field of view fl. In addition, the eye tracking device 110 may be disposed at one side of a rearview mirror M1, such that the eye tracking device 110 faces the driver 21 to capture an eye image of the driver 21 so as to detect a gaze position of the driver 21. Nevertheless, FIG. 2 is merely exemplary, and numbers and actual positions of the eye tracking device 110 and the image capturing device 150 are not particularly limited by the invention and can be designed according to actual applications.

Figure 3:
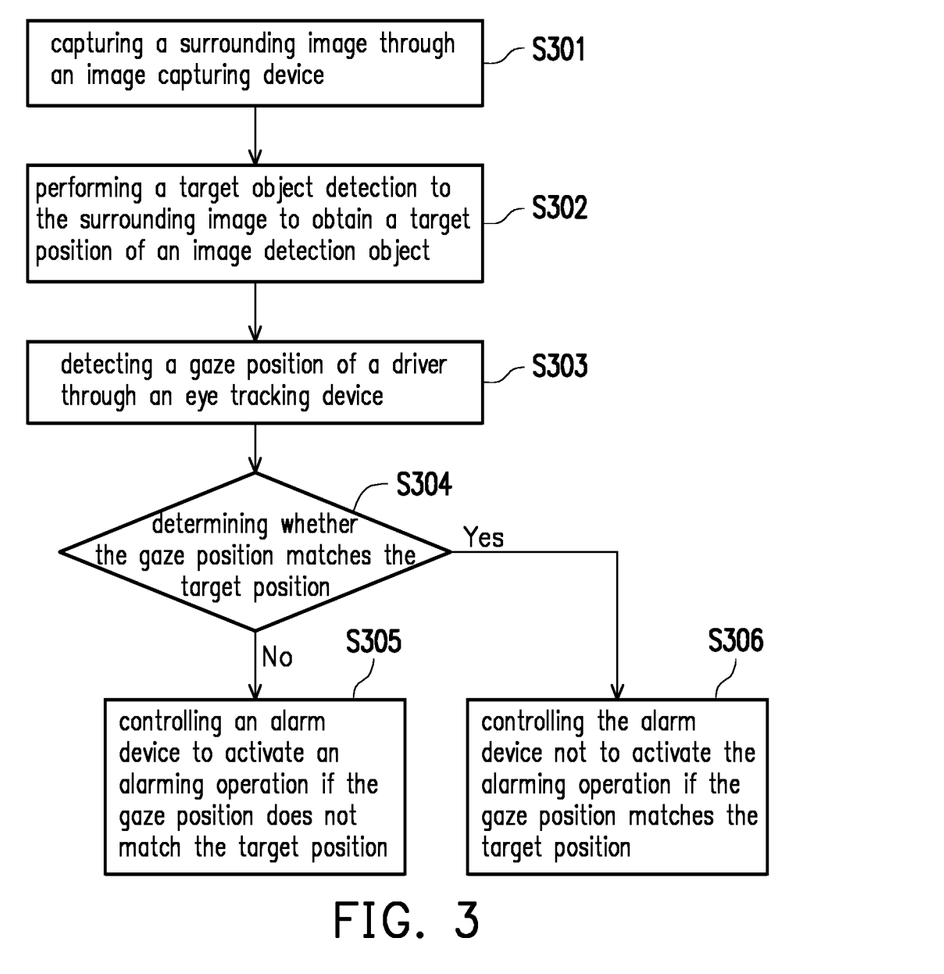
FIG. 3 is a flowchart of a driving notification method according to an embodiment of the invention.

FIG. 3 is a flowchart of a driving notification method according to an embodiment of the invention. With reference to FIG. 3, the method provided by this embodiment is suitable for the driving notification system 10 of the foregoing embodiment, and detailed steps of providing an alarm according to the gaze position of the driver in this embodiment is described with reference to the elements in the driving notification system 10 as follows.

First of all, in step S301, the processor 130 captures the surrounding image through the image capturing device 150. The image capturing device 150 is configured to capture an image around the mobile vehicle, for example, the image capturing device 150 may face a traveling direction, a lateral side of the traveling direction, or a rear side of the traveling direction to capture the surrounding image. Besides, the number of the capturing device 150 is not limited by the invention. In an embodiment, the processor 130 can simultaneously capture a plurality of surrounding images by using more than one image capturing devices. Note that a field of view (FOV) of the image capturing device 150 is determined according to a performance and a position of the image capturing device 150, and an imaging content of the surrounding image is determined by the field of view of the image capturing device 150.

In step S302, the processor 130 performs a target object detection to the surrounding image to obtain a target position of an image detection object. Particularly, specific image features of a variety of target objects are established in a data base. The processor 130 can analyze the surrounding image according to the specific image features in the data base, so as to determine whether an image detection object matching the specific image features exists in the surrounding image. In other words, when an image detection object matching the specific image features is found to exist in the surrounding image in front of the vehicle, the processor 130 can determine that the target object is located in a shooting direction of the image capturing device 150, such as in front of the vehicle. For instance, the processor 130 can perform an image analysis through a contour information or a color information of the surrounding image, so as to detect whether a target object exists or not. The foregoing target object can be a traffic sign (e.g., a traffic light, a driving regulatory sign, a road instruction sign, etc.) or an obstruction (e.g., a pedestrian, a roadblock, an animal, etc.).

In an embodiment, the target position of the image detection object may be image coordinates on the surrounding image or may be three-dimensional space coordinates generated through space depth analysis, which should however not be construed as limitations to the invention. Note that if the target position of the image detection object are the three-dimensional space coordinates, the three-dimensional space coordinates of the image detection object can be obtained through a depth information calculation by installing more than one image capturing devices to capture a plurality of surrounding images.

In step S303, the processor 130 detects the gaze position of the driver through the eye tracking device 110. In an embodiment, the eye tracking device 110 may detect and determine a line-of-sight location through the image analysis. In addition, in eye tracking technology, based on the two eye images captured successively, a degree of positional shift of an identical pupil feature point can also be calculated to serve as a movement information of the eyes. Alternatively, the tracking of the gaze position may also be performed according to relations among the pupils, orbital positions, shapes, line-of-sight directions, etc. by the eye tracking device 110. The eye tracking device 110 continues to provide the gaze position of the driver detected to the processor 130. In an embodiment, the eye tracking device 110 can analyze the two-dimensional projection coordinates of the line-of-sight projecting on the projection plane in front of the driver, and the two-dimensional projection coordinates may act as the gaze position of the driver. In an embodiment, the gaze position of the driver may also be three-dimensional space coordinates based on configurations of the depth information of the projection plane.

In step S304, the processor 130 determines whether the gaze position matches the target position. To be specific, after the processor 130 obtains the gaze position provided by the eye tracking device 110 and analyzes the target position, the processor 130 can determine whether the gaze position and the target position are close enough, so as to determine whether the line-of-sight of the driver falls on the target object.

In step S305, if the gaze position does not match the target position (No is determined in step S304), the processor 130 controls the alarm device 120 to activate the alarming operation. In another aspect, in step S306, if the gaze position matches the target position (Yes is determined in step S304), the processor 130 controls the alarm device 120 not to activate the alarming operation. In other words, in response to determining the gaze position does not match the target position, the processor 130 control the alarm device 120 to activate the alarming operation. In response to determining the gaze position matches the target position, the processor 130 control the alarm device 120 not to activate the alarming operation. To be specific, when the processor 130 determines that the gaze position of the driver does not match the target position of the image detection object, meaning that the driver does not gaze at the target object, the processor 130 can control the alarm device 120 to issue an audible alarm, a visual alarm, or a tactile alarm to notify the driver, so as to inform the driver that there are important target objects around the mobile vehicle being ignored.

Nevertheless, the embodiments of the invention are not limited to the foregoing descriptions. The above embodiments may be varied/modified according to the actual requirements. For instance, in an embodiment of the invention, after the alarm device is activated, the gaze position can be determined again whether to match the target position, so as to stop the alarm device from performing the alarming operation continuously or further controlling the components of the mobile vehicle. An embodiment is explained in detail below.

Figure 4:
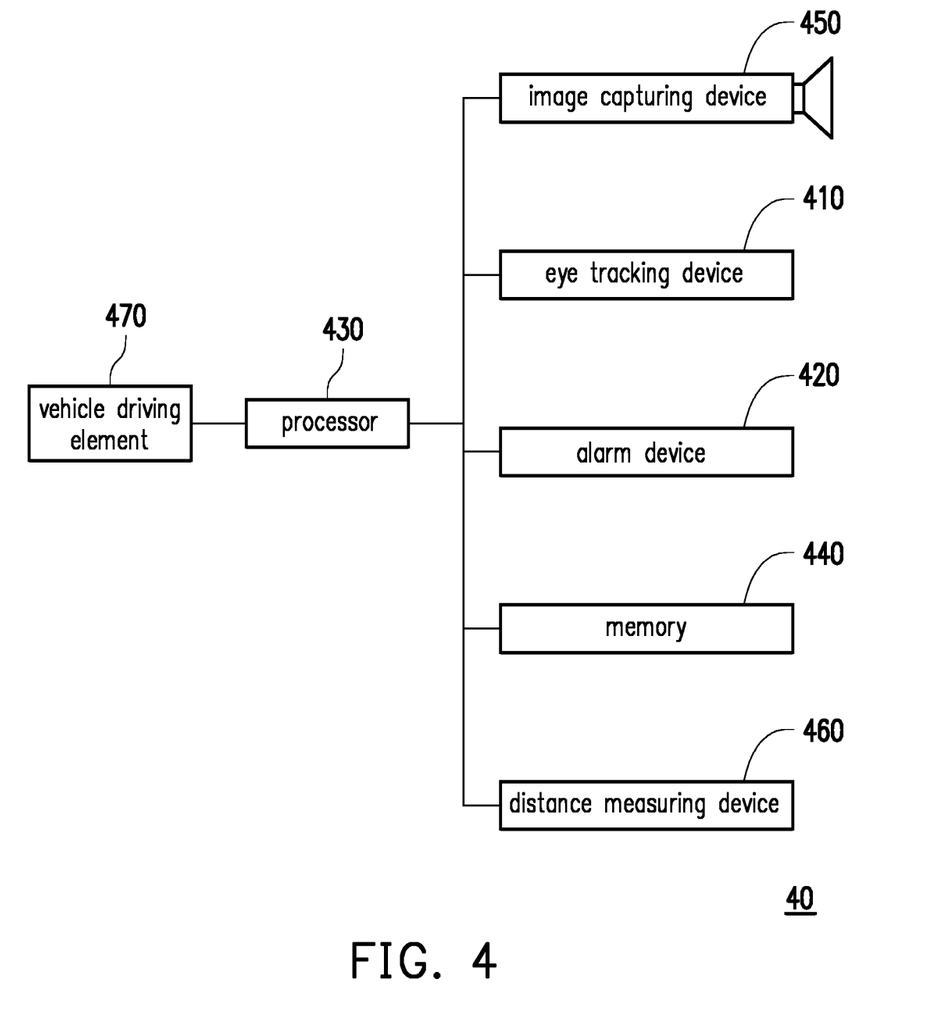
FIG. 4 is a block diagram of a driving notification system according to an embodiment of the invention.

FIG. 4 is a block diagram of a driving notification system according to an embodiment of the invention. With reference to FIG. 4, a driving notification system 40 includes an eye tracking device 410, an alarm device 420, a processor 430, a memory 440, an image capturing device 450, and a distance measuring device 460. Note that functions and coupling relations of the eye tracking device 410, the alarm device 420, the processor 430, the memory 440, and the image capturing device 450 are similar to that of the eye tracking device 110, the alarm device 120, the processor 130, the memory 140, and the image capturing device 150 of FIG. 1, and that detailed descriptions are not further provided hereinafter. A difference between FIG. 4 and FIG. 1 includes that the driving notification system 40 further includes the distance measuring device 460. Moreover, the processor 430 is coupled to a vehicle driving element 470 of the mobile vehicle.

The distance measuring device 460 can be an ultrasonic measuring device, an infrared measuring device, or a laser measuring device (aka a light detection and ranging device) and is configured to measure a distance between the mobile vehicle and the target object. The distance measuring device 460 can also be an image depth analysis device, so as to be used to determine the distance between the target object and the mobile vehicle according to an image depth value. The vehicle driving element 470 can be a braking device, a speed control device, a direction control device, or other mechanical components of the mobile vehicle.

Figure 5:
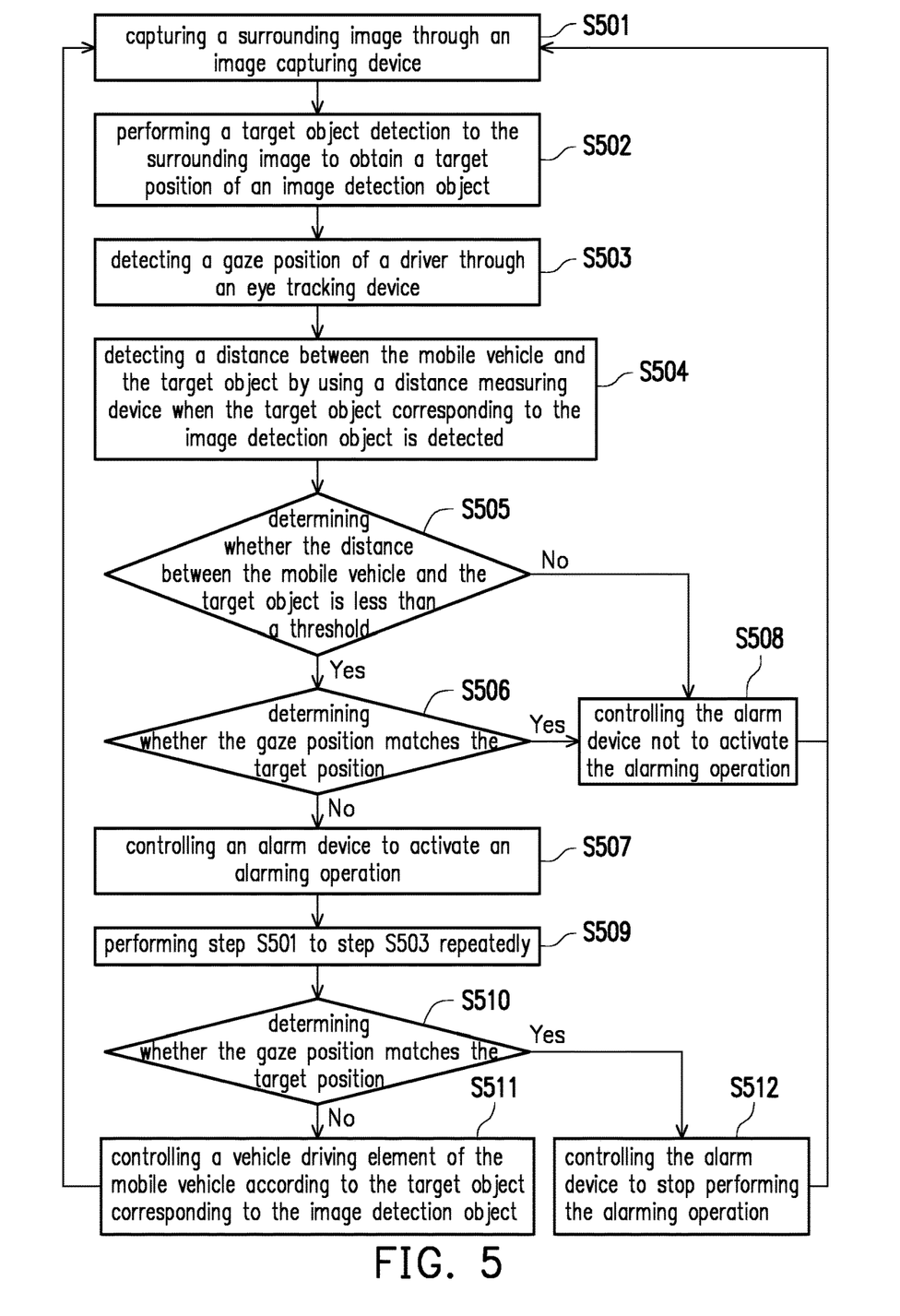
FIG. 5 is a flowchart of a driving notification method according to an embodiment of the invention.

FIG. 5 is a flowchart of a driving notification method according to an embodiment of the invention. With reference to FIG. 5, the method provided by this embodiment is suitable for the driving notification system 40 of the foregoing embodiment, and detailed steps of providing an alarm according to the gaze position of the driver in this embodiment is described with reference to the elements in the driving notification system 40 as follows.

In step S501, the processor 430 captures a surrounding image through the image capturing device 450. In step S502, the processor 430 performs a target object detection to the surrounding image to obtain a target position of an image detection object. In step S503, a gaze position of a driver is detected by the processor 430 through the eye tracking device 410.

Figure 6:
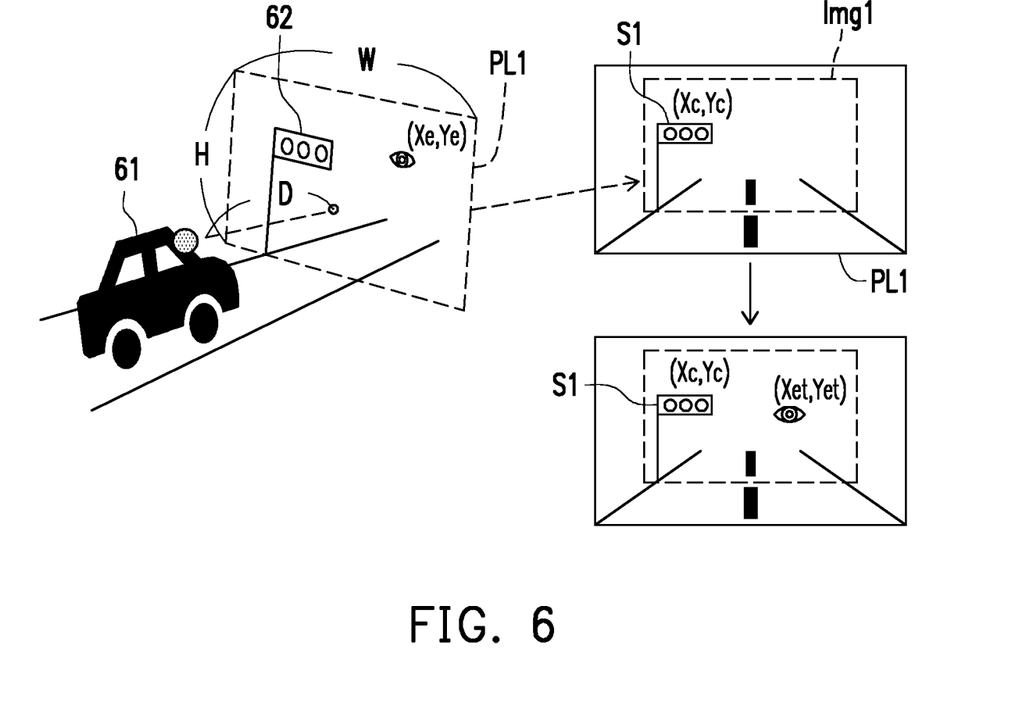
FIG. 6 is a schematic diagram of obtaining a gaze position according to an embodiment of the invention.

For instance, FIG. 6 is a schematic diagram of obtaining a gaze position according to an embodiment of the invention. With reference to FIG. 6, a mobile vehicle 61 is driven on a road, the image capturing device 450 disposed on the mobile vehicle 61 faces a traveling direction to take a photo, and the eye tracking device 410 disposed on the mobile vehicle 61 is configured to detect a gaze position of a driver. To be specific, the processor 430 may obtain a reference set value of a projection plane PL1 set by the eye tracking device 410 and may also obtain a projection position (Xe, Ye) reflecting an eye gaze of the driver on the projection plane PL1 provided by the eye tracking device 410. The foregoing reference set value includes a width W and a height H of the projection plane PL1 as well as a distance D between the projection plane PL1 and the mobile vehicle 61.

In another aspect, the image capturing device 450 can capture a surrounding image Img1 in front of the mobile device 61 according to a field of view thereof and a position where the image capturing device 450 is disposed. The processor 430 can detect that an image detection object S1 of a target object 62 (i.e., the traffic light) exists on the surrounding image Img1 and thus obtains a target position (Xc, Yc) of the image detection object S1 on the surrounding image Img1. In another aspect, the processor 430 can convert the projection position (Xe, Ye) on the projection plane PL1 to a relative position (Xet, Yet) on the surrounding image Img1 to obtain the gaze position of the driver according to a field of view of the image capturing device 450 and the reference set value of the projection plane PL1. In other words, the processor 430 can map any coordinate on the projection plane PL1 onto the image coordinate on the surrounding image Img1 according to the field of view of the image capturing device 450. Here, the processor 430 regards the relative position (Xet, Yet) as the gaze position of the driver. As such, in the following steps, the processor 430 can determine whether the gaze position of the driver falls on the target object according to the target position (Xc, Yc) and the relative position (Xet, Yet).

Figure 7A:
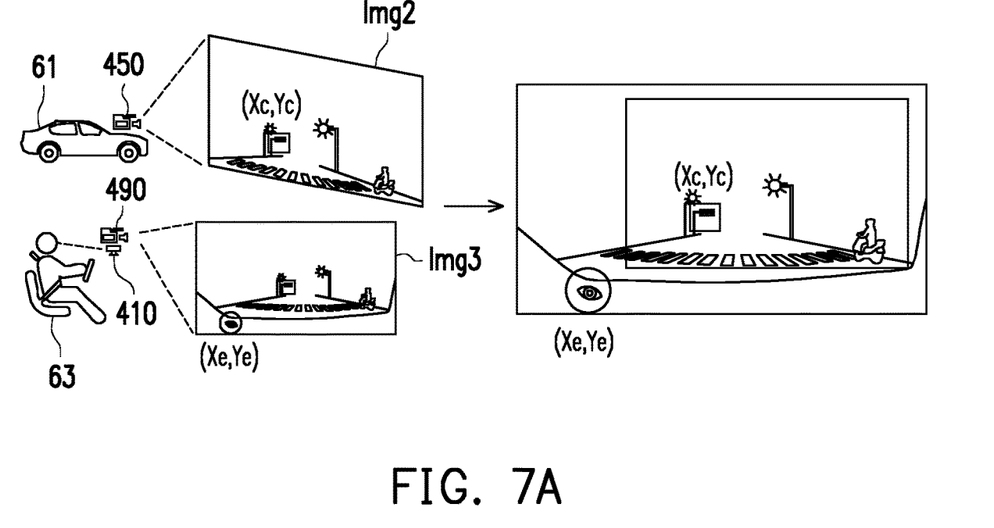
FIG. 7A and FIG. 7B are scenario schematic diagrams of obtaining a gaze position according to an embodiment of the invention.

FIG. 7A and FIG. 7B are scenario schematic diagrams of obtaining a gaze position according to an embodiment of the invention. With reference to FIG. 7A first, a surrounding image Img2 can be photographed by the image capturing device 450 disposed at an external portion of the mobile vehicle 61, and a projection reference image Img3 can be photographed by an image capturing device 490 disposed at an internal portion of the mobile vehicle 61. Note that in the example of FIG. 7A, the image capturing device 490 may be disposed based on a projection plane of the eye tracking device 410, such that a field of view of the image capturing device 490 configured to generate the projection reference image Img3 is disposed to be identical to a virtual space of the eye tracking device 410. The eye tracking device 410 is configured to detect a position in which the line-of-sight of the driver falls in the virtual space, and the projection plane of the eye tracking device 410 is a plane in the virtual space perpendicular to the ground. As such, through performing image calibration and matching to the surrounding image Img2 and the projection reference image Img3, the projection position (Xe, Ye) reflecting the eye gaze of the driver on the projection plane set by the eye tracking device 410 may be converted to the relative position (Xet, Yet) on the surrounding image Img2.

Figure 7B:
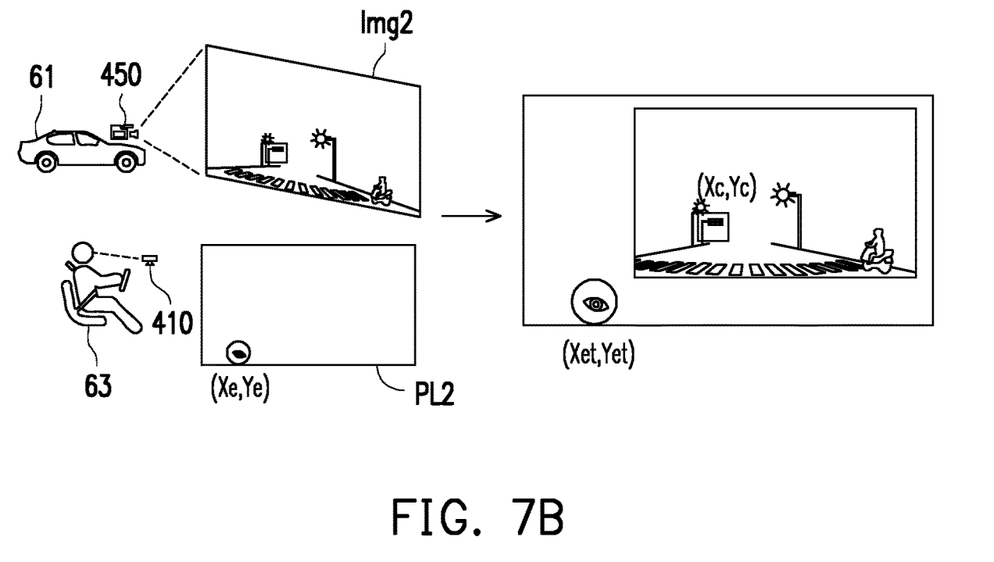

With reference to FIG. 7B, the mobile vehicle 61 does not have the image capturing device 490 disposed at the inner portion compared to FIG. 7A. As shown in the example of FIG. 7B, the eye tracking device 410 can detect the projection position (Xe, Ye) projected on the projection plane PL2 based on the reference set value of the projection plane PL2. The surrounding image Img2 can be photographed by the image capturing device 450 disposed at the external portion of the mobile vehicle 61, the projection position (Xe, Ye) reflecting the eye gaze of the driver on the projection plane PL2 set by the eye tracking device 410 can be converted to the relative position (Xet, Yet) on the surrounding image Img2 through performing image calibration and mapping relative to the field of view of the projection plane PL2 to the image Img2. In can thus be seen that based on the examples of FIG. 7A and FIG. 7B, the projection position (Xe, Ye) can be mapped into a coordinate space of the target position (Xc, Yc), and the gaze position (Xet, Yet) of the driver is thus accordingly obtained.

With reference to FIG. 5, in step S504, when the target object corresponding to the image detection object is detected, the processor 430 detects a distance between the mobile vehicle and the target object by using the distance measuring device 460. Next, in step S505, the processor 430 determines whether the distance between the mobile vehicle and the target object is less than a threshold. If No is determined in step S505, meaning that the distance between the target object and the mobile vehicle is overly far and that the driver is not required to be particularly notified to pay attention, and therefore, the processor 430 controls the alarm device 420 not to activate the alarming operation in step S508. For instance, a distance A1 (in meter) between the mobile vehicle and the traffic light may be measured by the distance measuring device 460. When the processor 430 determines that A1 (in meter) is greater than a threshold B1 (in meter), the processor 430 does not activate the alarm device 420 and does not further determine that whether the target position of the traffic light matches the gaze position, either.

Note that the threshold can be set according to actual applications. In an embodiment, the threshold may further provide corresponding values according to the type of the target object. Taking the target object acting as an obstruction for example, obstructions that are too far away from each other are not required to be paid attention to by the driver urgently, as such, a threshold corresponding to the obstructions can be set as a first value. Taking the target object acting as a specific traffic sign for example, a threshold corresponding to the specific traffic sign can be set as a second value different from the first value.

In another aspect, if Yes is determined in step S505, the processor 430 determines whether the gaze position matches the target position in step S506. It can be seen in FIG. 6, FIG.

7A, and FIG. 7B that the processor 430 can obtain the target position according to the surrounding image and calculates the gaze position according to the projection position provided by the eye tracking device 410. As such, the processor 430 can further determine whether the gaze position matches the target position and whether the gaze position and the target position are close enough. In an embodiment, the processor 430 can determine whether the gaze position matches the target position based directly on the distance between the gaze position and the target position.

Figure 8:
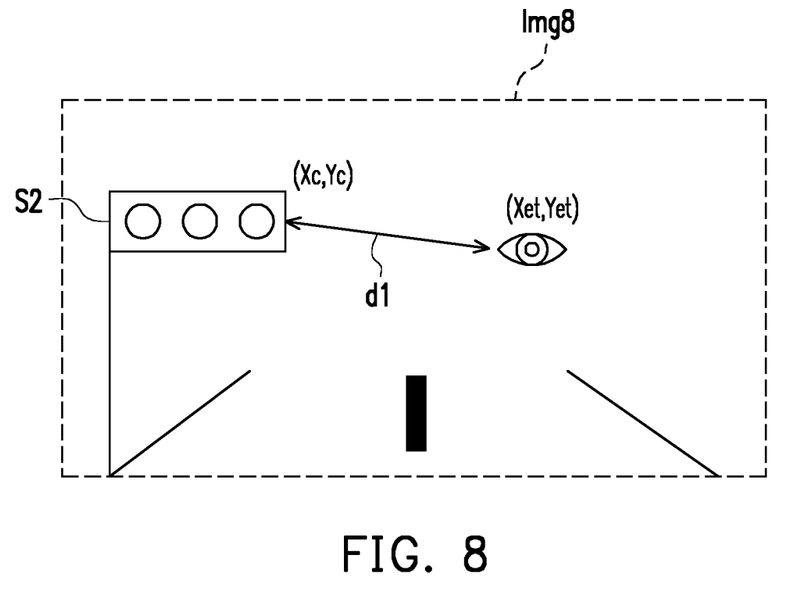
FIG. 8 is a schematic diagram of determining whether a gaze position matches a target position according to an embodiment of the invention.

For instance, FIG. 8 is a schematic diagram of determining whether a gaze position matches a target position according to an embodiment of the invention. With reference to FIG. 8, the processor 430 can determine whether a gap d1 between a target position (Xc, Yc) of an image detection object S2 on a surrounding image Img8 and the gaze position (Xet, Yet) of the driver is greater than a threshold. When the gap d1 between the target position (Xc, Yc) of the image detection object S2 on the surrounding image and the gaze position (Xet, Yet) of the driver is greater than the threshold, the processor 430 can determine that the gaze position does not match the target position. When the gap d1 between the target position (Xc, Yc) of the image detection object S2 on the surrounding image Img8 and the gaze position (Xet, Yet) of the driver is less than or equal to the threshold, the processor 430 can determine that the gaze position matches the target position.

Figure 9:
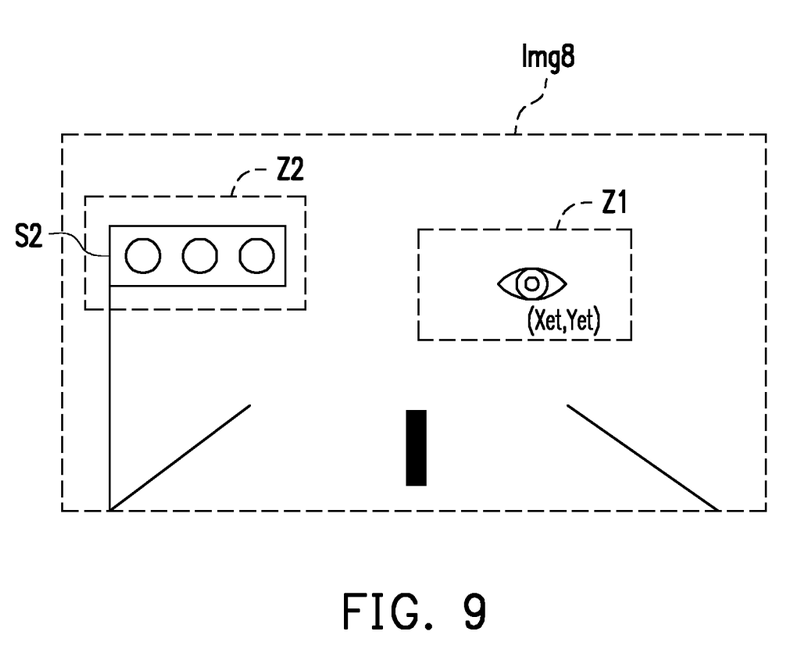
FIG. 9 is a schematic diagram of determining whether a gaze position matches a target position according to an embodiment of the invention.

In addition, in an embodiment, the processor 430 can also determine whether the gaze position matches the target position according to image similarity between the image detection object and an image block covering the gaze position. For instance, FIG. 9 is a schematic diagram of determining whether a gaze position matches a target position according to an embodiment of the invention. With reference to FIG. 9, the processor 430 may obtain a specific block Z on the surrounding image Img8 by serving the gaze position (Xet, Yet) of the driver as an extending basis. The processor 430 determines the image similarity between the specific block Z1 and the image detection object S2. From another aspect, the processor 430 determines image similarity between the specific block Z1 and an image block Z2 including the image detection object S2. When the image similarity between the specific block Z1 and the image detection object S2 is greater than the threshold, the processor 430 can determine that the gaze position matches the target position. When the image similarity between the specific block and the image detection object is less than or equal to the threshold, the processor 430 can determine that the gaze position does not match the target position.

With reference to FIG. 5, if Yes is determined in step S506, meaning that the gaze position of the driver falls on the target position, the processor 430 controls the alarm device 420 not to activate the alarming operation in step S508. If No is determined in step S506, meaning that the gaze position of the driver does not fall on the target position, the processor 430 controls the alarm device 420 to activate the alarming operation in step S507. After the alarming operation is activated, the processor 460 repeats step S501 to S503 in step S509. Next, in step S510, the processor 430 re-determines whether the gaze position matches the target position.

If Yes is determined in step S510, meaning that the gaze position of the driver falls on the target position after being notified by the alarming operation, the processor 430 controls the alarm device 420 to stop performing the alarming operation in step S512. If No is determined in step S510, meaning that the gaze position of the driver still does not fall on the target position after being notified by the alarming operation, the processor 430 can control the vehicle driving element 470 of the mobile vehicle according to the target object corresponding to the image detection object in step S511. In an embodiment, the processor 430 can control a speed control device of the mobile vehicle according to the traffic sign or the obstruction, so as to lower a driving speed of the mobile vehicle. That is, when the driver continuously fail to notice the target object, the processor 430 can control the vehicle driving element 470 of the mobile vehicle according to the type of the target object and then intervenes in the driving behavior of the driver. For instance, if the target object is a speed limit sign, the processors 430 controls the speed limit element of the mobile vehicle to lower a moving speed. If the target object is an obstruction, the processors 430 controls a brake device of the mobile vehicle to perform automatic braking.

In view of the foregoing, in the embodiments of the invention, the line-of-sight location of the driver is obtained through the eye tracking device. Moreover, whether the line-of-sight of the driver falls on the target object around the mobile vehicle can also be determined. When the gaze position of the driver does not match the target position, an alarm is provided by the invention to notify the driver to focus on the target object that needs to be noticed. The alarm is timely provided according to the line-of-sight of the driver, and the line-of-sight of the driver is thus expected to fall on the object on the road that needs to be noticed. In addition, the invention may further intervene in the driving behavior according to the line-of-sight of the driver, so as to prevent urgent and dangerous situations from happening. Therefore, a driving assistance providing high level of safety is provided by the invention, so as to lower probability of traffic accidents.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving notification method, for a driving notification system comprising an eye tracking device and an image capturing device, the driving notification system being disposed on a mobile vehicle, the driving notification method comprising:

capturing a surrounding image through the image capturing device;

detecting a target object according to information of the surrounding image to obtain a target position of an image detection object matching specific image feature;

detecting a gaze position of a driver through the eye tracking device;

determining whether the gaze position matches the target position; and controlling an alarm device to activate an alarming operation according to whether the gaze position matches the target position, wherein the step of determining whether the gaze position matches the target position comprises:

detecting a distance between the mobile vehicle and the target object by using a distance measuring device; and determining whether the gaze position matches the target position in response to the distance between the mobile vehicle and the target object is less than a threshold.

2. The driving notification method as claimed in claim 1, wherein the step of controlling the alarm device to activate the alarming operation according to whether the gaze position matches the target position comprises:
controlling the alarm device not to activate the alarming operation in response to the gaze position matches the target position; and
controlling the alarm device to activate the alarming operation in response to the gaze position does not matches the target position.

3. The driving notification method as claimed in claim 1, wherein the method further comprises:
controlling a vehicle driving element of the mobile vehicle according to the target object corresponding to the image detection object in response to the gaze position does not matches the target position.

4. The driving notification method as claimed in claim 3, wherein the target object comprises a traffic sign or an obstruction, and the step of controlling the vehicle driving element of the mobile vehicle according to the target object corresponding to the image detection object comprises:
controlling a speed control device or a braking device of the mobile vehicle according to the traffic sign or the obstruction to lower a driving speed of the mobile vehicle.

5. The driving notification method as claimed in claim 1, wherein method further comprises: providing the threshold according to a type of the target object.

6. The driving notification method as claimed in claim 1, wherein the step of detecting the gaze position of the driver through the eye tracking device comprises:
obtaining a reference set value of a projection plane of the eye tracking device and a projection position reflecting an eye gaze of the driver on the projection plane, wherein the reference set value comprises a width and a height of the projection plane, and a distance between the projection plane and the mobile vehicle; and
converting the projection position on the projection plane into a relative position on the surrounding image to obtain the gaze position of the driver according to a field of view of the image capturing device and the reference set value of the projection plane.

7. The driving notification method as claimed in claim 6, wherein the step of determining whether the gaze position matches the target position comprises:
determining whether a distance between the target position of the image detection object on the surrounding image and the gaze position of the driver is greater than a threshold,
wherein the gaze position does not match the target position if the distance between the target position of the image detection object on the surrounding image and the gaze position of the driver is greater than the threshold; and the gaze position matches the target position if the distance between the target position of the image detection object on the surrounding image and the gaze position of the driver is less than or equal to the threshold.

8. The driving notification method as claimed in claim 6, wherein the step of determining whether the gaze position matches the target position comprises:
obtaining a specific block on the surrounding image by serving the gaze position of the driver as an extending basis; and
determining image similarity between the specific block and the image detection object,
wherein the gaze position matches the target position if the image similarity between the specific block and the image detection object is greater than a threshold; and the gaze position does not match the target position if the image similarity between the specific block and the image detection object is less than or equal to the threshold.

9. A driving notification system disposed on a mobile vehicle, comprising:
an image capturing device;
an eye tracking device;
a memory, storing a plurality of instructions;
a distance measuring device; and
a processor, coupled to the image capturing device, the eye tracking device, the memory, and the distance measuring device, wherein the processor is configured to execute the instructions to:
capture a surrounding image through the image capturing device;
detect a target object according to contour information or color information of the surrounding image to obtain a target position of an image detection object matching specific image feature;
detect a gaze position of a driver through the eye tracking device;
determine whether the gaze position matches the target position;
control an alarm device to activate an alarming operation according to whether the gaze position matches the target position;
detect a distance between the mobile vehicle and the target object by using the distance measuring device; and
determine whether the gaze position matches the target position in response to the distance between the mobile vehicle and the target object is less than a threshold.

10. The driving notification system as claimed in claim 9, wherein the processor is further configured to execute the instructions to:
control the alarm device not to activate the alarming operation in response to the gaze position matches the target position; and
control the alarm device to activate the alarming operation in response to the gaze position does not matches the target position.

11. The driving notification system as claimed in claim 9, wherein the processor is coupled to a vehicle driving element of the mobile vehicle, and the processor is further configured to execute the instructions to:
control a vehicle driving element of the mobile vehicle according to the target object corresponding to the image detection object in response to the gaze position does not matches the target position.

12. The driving notification system as claimed in claim 11, wherein the target object comprises a traffic sign or an obstruction, and the processor is further configured to execute the instructions to:
control a speed control device or a braking device of the mobile vehicle according to the traffic sign or the obstruction to lower a driving speed of the mobile vehicle.

13. The driving notification system as claimed in claim 9, wherein the processor is further configured to execute the instructions to:
provide the threshold according to a type of the target object.

14. The driving notification system as claimed in claim 9, wherein the processor is further configured to execute the instructions to:

obtain a reference set value of a projection plane of the eye tracking device and a projection position reflecting an eye gaze of the driver on the projection plane, wherein the reference set value comprises a width and a height of the projection plane, and a distance between the projection plane and the mobile vehicle; and convert the projection position on the projection plane into a relative position on the surrounding image to obtain the gaze position of the driver according to a field of view of the image capturing device and the reference set value of the projection plane.

15. The driving notification system as claimed in claim 14, wherein the processor is further configured to execute the instructions to:

determine whether a distance between the target position of the image detection object on the surrounding image and the gaze position of the driver is greater than a threshold, wherein the gaze position does not match the target position if the distance between the target position of the image detection object on the surrounding image and the gaze position of the driver is greater than the threshold; and the gaze position matches the target position if the distance between the target position of the image detection object on the surrounding image and the gaze position of the driver is less than or equal to the threshold.

16. The driving notification system as claimed in claim 14, wherein the processor is further configured to execute the instructions to:

obtain a specific block on the surrounding image i by serving the gaze position of the driver as an extending basis; and determine image similarity between the specific block and the image detection object, wherein the gaze position matches the target position if the image similarity between the specific block and the image detection object is greater than a threshold; the gaze position does not match the target position if the image similarity between the specific block and the image detection object is less than or equal to the threshold.

* * * * *